United States Patent [19]

Cormier, Jr. et al.

[11] Patent Number: 4,508,840

[45] Date of Patent: Apr. 2, 1985

[54] METHOD OF PREPARING A HIGH-DENSITY CRACKING CATALYST WITH REDUCED SULFUR EMISSIONS FROM COKE

[75] Inventors: William E. Cormier, Jr., Clarksboro; Gary M. Pasquale, Sewell; William A. Stover, Woodbury, all of N.J.

[73] Assignee: Mobil Oil Corporation, New York, N.Y.

[21] Appl. No.: 403,691

[22] Filed: Jul. 30, 1982

[51] Int. Cl.$^3$ .............................................. B01J 29/08
[52] U.S. Cl. ......................................... 502/70; 502/76
[58] Field of Search .............. 252/453, 455 Z; 502/76, 502/235, 236

[56] References Cited

U.S. PATENT DOCUMENTS

| | | |
|---|---|---|
| 2,872,410 | 2/1959 | Erickson ........................ 502/235 X |
| 3,124,541 | 3/1964 | Wilson, Jr. et al. ................ 502/235 |
| 3,137,658 | 6/1964 | Drake et al. ........................ 502/236 |
| 3,313,594 | 4/1967 | Wilson, Jr. ....................... 252/455 Z |
| 3,451,947 | 6/1969 | Michael ................................ 252/453 |
| 3,520,828 | 7/1970 | Rosinski .............................. 252/453 |
| 3,531,397 | 9/1970 | Michalko ......................... 252/455 Z |
| 3,556,988 | 1/1971 | Stover et al. .................... 252/455 Z |
| 3,939,058 | 2/1976 | Plank et al. ..................... 252/455 Z |

*Primary Examiner*—Carl F. Dees
*Attorney, Agent, or Firm*—A. J. McKillop; M. G. Gilman; J. F. Powers, Jr.

[57] ABSTRACT

Preparation of the silica and alumina matrix components of a zeolite cracking catalyst while intimately mixing at a pH of 3.0 to about 4.5 results in a selective catalyst of high density and low pore volume. The coke produced during cracking emits lower amounts of sulfur during regeneration of tha catalyst translating to reduced sulfur oxide stack emissions.

11 Claims, No Drawings

METHOD OF PREPARING A HIGH-DENSITY CRACKING CATALYST WITH REDUCED SULFUR EMISSIONS FROM COKE

BACKGROUND OF THE INVENTION

1. Field of the Invention

The present invention relates to a method of preparing a cracking catalyst which comprises active catalytic fines dispersed in a matrix and the use thereof in a catalytic cracking process whereby the amount of sulfur compounds in the catalyst regenerator flue gas is reduced.

In fluidized catalytic cracking (FCC) systems a fluidized bed of particulate catalyst is continuously cycled between a cracking zone wherein the hydrocarbon feedstream is contacted with the fluidized catalyst particles and a catalyst regeneration zone. Hydrocarbon cracking in the reaction zone results in deposition of carbonaceous coke on the catalyst particles. The cracked hydrocarbons are thereafter separated from the coked catalyst and withdrawn. The coked catalyst is then stripped of volatiles and passed into the catalyst regeneration zone. In the catalyst regenerator, the coked catalyst is contacted with a gas containing a controlled amount of molecular oxygen to burn off a desired portion of coke and simultaneously heat the catalyst to a sufficiently high temperature so as to activate the catalyst when the catalyst is again contacted with the hydrocarbon stream in the cracking zone for catalyzing the hydrocarbon cracking. A flue gas is formed by the burning procedure in the regeneration zone and is normally passed into the atmosphere after treatment to remove particulates and carbon monoxide.

The hydrocarbon feeds processed in commercial FCC units normally contain sulfur. A significant portion of the sulfur contained in the hydrocarbon feedstream processed in an FCC system is invariably deposited on the catalyst particles in the coke. Accordingly, the flue gas which is formed by burning the coke in the catalyst regenerator contains gaseous sulfur oxide ($SO_x$) such as sulfur dioxide and sulfur trioxide.

At present, there are restrictions on the quantity of $SO_x$ which can be emitted from FCC units and these restrictions are being reviewed for the possibility of making such restrictions more stringent. Currently available methods of reducing $SO_x$ emissions from FCC units and, in particular the catalyst regenerator, include desulfurizing the regenerator flue gas by conventional stack gas scrubbing which necessitates large capital investments. Alternatively, desulfurizing the hydrocarbon feed in a separate desulfurization unit to reduce $SO_x$ emissions also requires elaborate additional processing operations and necessitates substantial additional capital. On the other hand, most of the sulfur which is contained in the hydrocarbon feedstock does not become sulfur which is contained within the coke deposited on the catalyst. Instead, the sulfur is converted to normally gaseous sulfur compounds such as hydrogen sulfide. The sulfur compounds are conventionally removed from the reactor along with the fluid hydrocarbon products. Removal of sulfur compounds such as hydrogen sulfide from the product effluent from a fluidized reactor is relatively simple and inexpensive as compared to the methods required for removal of sulfur oxides from the regenerator flue gas and hydrocarbon feed. However, many of the petroleum stocks currently available for processing in fluidized units have a high sulfur content and thus, the large capital investments required to reduce $SO_x$ emissions from the regenerator flue gas must be made in order to process hydrocarbon streams.

Catalyst modification, therefore, to effect the required reductions in $SO_x$ emissions from fluidized cracking units is much preferred over the currently available methods.

Cracking catalysts are solid materials which have acidic properties. Because of the nature of the reactions taking place, the catalyst must have high porosity. Furthermore, since the catalyst circulates rapidly between reaction zones and burning, or regeneration zones, it must also have resistance to abrasion, temperature changes and the like.

Natural catalysts which are used in fluidized systems are composed primarily of silica and alumina, but they contain certain other materials which may be harmful under certain circumstances. The synthetic crystalline silica-alumina materials (active crystalline zeolites) are generally made from pure materials so that many of the shortcomings of the natural materials have been overcome. However, zeolite catalysts contained in a gelled matrix such as a silica-alumina matrix and prepared by prior art processes are subject to excessive attrition, aging and loss of activity and selectivity. Accordingly, the trend in commercial fluid catalytic cracking is toward the use of high density catalysts. The higher density in conjunction with increased attrition resistance is a major factor in improving catalyst retention in a fluidized cracking unit. As a result, the make-up rate of fresh catalyst can be reduced and dust emissions from the flue gas stacks are lowered. At the same time, however, the characteristic of high density must not result in the loss of product selectivity.

2. Brief Description of the Prior Art

It has been suggested in U.S. Pat. No. 3,835,031 to reduce the amount of sulfur oxides in FCC regenerator flue gas by impregnating a Group II-A metal oxide onto a conventional silica-alumina cracking catalyst. The Group II-A metals react with sulfur oxides in the flue gas to form solid sulfur-containing compounds. It has been disclosed that the attrition encountered when using unsupported Group II-A metals is thereby reduced. It has also been disclosed, however, that Group II-A metal oxides, such as magnesia, when used as a component of cracking catalysts, have a highly undesirable effect on the activity and selectivity of the cracking catalyst. The addition of a Group II-A metal to a cracking catalyst results in two particularly noticeable adverse consequences relative to the results obtained without the Group II-A metals: (1) the yield of the liquid hydrocarbon fraction is substantially reduced, typically by greater than one volume percent of the feed volume; and (2) the octane rating of the gasoline is substantially reduced. Both of the above adverse consequences are severely detrimental to the economic viability of a fluidized operation, and even complete removal of sulfur oxides from regenerator flue gas could not compensate for the losses in yield and octane which result from adding Group II-A metals to an FCC catalyst.

Other patents including U.S. Pat. Nos. 4,071,436; 4,115,249; 4,115,250; 4,115,251; 4,166,787; 4,204,944; and 4,204,945 propose the reduction of $SO_x$ emissions from regenerator flue gas by contacting the sulfur compounds with an oxidation promoter and reactive alumina. The resulting solid aluminum-sulfate compound, formed in the regenerator, is reduced to hydrogen sulfide gas and reactive alumina in the reaction zone. The alumina can be impregnated on the standard catalyst, incorporated into the catalyst during manufacture, or admixed with a standard catalyst as a separate particle. There is a significant economic advantage by shifting the sulfur from the regenerator flue gas to the reactor effluent as hydrogen sulfide. As mentioned previously, most of the sulfur contained in the hydrocarbon feedstock is converted to normally gaseous sulfur compounds such as hydrogen sulfide in the reactor. Accordingly, if gaseous sulfur compounds normally removed from the fluidized unit in the regenerator flue gas can instead be removed from the reactor as hydrogen sulfide along with the processed hydrocarbons, the shifted sulfur is simply a small addition to the large amount of hydrogen sulfide and organic sulfur already present in the reactor effluent. Hydrogen sulfide removal from the reactor effluent is substantially less expensive than separate feed desulfurization or flue gas desulfurization.

Co-pending application Ser. No. 945,967, filed Sept. 26, 1978 now abandoned, discloses impregnating standard catalysts with rare earth oxides such as $Cr_2O_3$, MnO, or CoO, alone or in combinations, or rare earth oxide with a platinum group metal oxidation promoter to reduce the sulfur content of coke and shift the sulfur removal to the cracked hydrocarbon effluent.

While the above-mentioned disclosures teach methods of reducing $SO_x$ emissions by catalyst modification, the disclosed processes require the addition of elements or compounds to the cracking catalyst. The present invention does not require the addition of any element or compound to the catalyst to reduce sulfur emissions and shift sulfur recovery from the regenerator flue gas to the effluent leaving the reaction zone. The reduction of sulfur emissions is accomplished solely by the manner in which the catalyst is formed.

Virtually all fluidized catalysts presently used include a gel or clay-type matrix of silica-alumina in which is dispersed particles of the crystalline zeolitic catalytic material. One method used commercially for manufacturing the catalysts involves formation of a silica-alumina co-gel, addition of small particles of zeolite to the co-gel, and formation of catalyst particles by spray-drying.

Several U.S. Patents disclose altering various characteristics of zeolite-containing silica-alumina catalysts by forming the cracking catalysts in a particular manner. For example, U.S. Pat. No. 4,219,446 discloses producing an attrition resistant, more active, more selective and more stable zeolite-containing catalyst by specially preparing a zeolite-containing silica-alumina hydrogel. One of the critical aspects of the invention is nozzle-mixing an acid alum solution and an aqueous solution of sodium silicate which comprises finely dispersed kaolin clay and calcined rare earth exchanged zeolite Y. The mixture has a pH above 9.

U.S. Pat. No. 3,957,689 discloses a process for preparing an attrition resistant zeolite hydrocarbon conversion catalyst comprising the steps of decreasing the pH of a sodium silicate solution to a pH of 2.0–3.2 by adding a mixed sulfuric acid-aluminum sulfate solution to form a buffered silica sol, adding clay before, during or after sol formation, preparing a water slurry of a crystalline zeolite and adjusting the pH to about 3–5, mixing the slurry with the buffered silica sol-clay slurry to prepare a spray drier feed slurry.

U.S. Pat. Nos. 3,520,828 and 3,939,058 disclose methods of preparing the silica and alumina matrix components of a fluid cracking catalyst which comprises the step of nozzle mixing a sodium silicate solution and an acid alum solution to form a hydrosol containing crystalline aluminosilicate fines. The gelled hydrosol has a pH of about 9.0.

SUMMARY OF THE INVENTION

In accordance with the present invention, basic and acidic solutions containing respective matrix components such as silica and alumina matrix components are intimately mixed such that the pH of the mixture or gel that is formed is never in excess of about 4.5 to produce a selective, high-density catalyst which, during regeneration, yields substantially lower sulfur oxide emissions from the coke which is deposited on the catalyst. In a related aspect, the present invention relates to an improved fluid catalytic cracking process using a zeolite cracking which comprises a silica-alumina matrix and which is produced by intimately mixing acidic and basic solutions containing the individual matrix components in such a manner that the mixture or gel is maintained at a pH of about 3.0 to 4.5. By the terms intimately mixing, it is meant that the matrix components are supplied separately to a mixing apparatus and each component is provided with a positive velocity simultaneous upon contact with the other component or immediately after contact therewith. For example, mixing the components through a nozzle, or supplying the components individually to a mixing vessel in which a stirring apparatus placed therein vigorously stirs the components simultaneously with or immediately following contact of the components, is appropriate in the present invention. It has been found that when the catalyst has been prepared in the above-described manner and is utilized in a fluid catalytic cracking process, the resultant high density catalyst allows the make-up rate of fresh catalyst to be reduced and dust emissions from the flue gas stacks lowered without loss in product selectivity. Additionally, the flue gas from the regenerator wherein the coke covered catalyst is contacted with oxygen to burn off a substantial portion of the coke and heat the catalyst to the desired temperature contains greatly reduced quantities of $SO_x$ compounds, reducing the need for large capital expenditures for stack gas scrubbing and/or feed desulfurization. The reduction in $SO_x$ from the flue gas in the regenerator is removed from the hydrocarbon cracking zone as increased hydrogen sulfide gas which is relatively simple and inexpensive to remove as compared to the conventional methods for removal of sulfur oxides from the regenerator flue gas.

DETAILED DESCRIPTION OF THE INVENTION

Fluid cracking catalysts are often prepared to contain an active crystalline zeolite, the balance being clay or a matrix formed from the mixture of basic and acidic solutions of matrix components such as an amorphous silica-alumina matrix. The catalysts are prepared as microspheroidal particles and generally contain from about 12 to about 30 percent of the active crystalline zeolite. The catalysts of this invention will contain generally from about 5 to about 30 percent by weight, of the total catalyst as zeolite. Total fines in the catalyst will be between about 5 percent and 60 percent by weight.

There are several problems inherent in cracking catalysts made by the processes of the prior art. As has been discussed previously, these problems concern mainly the attrition and loss of activity and selectivity of the catalyst and the amount of $SO_x$ emissions during the regeneration of the catalyst. The latter problem is particularly disadvantageous since, as mentioned above, the capital investment which must be made to reduce $SO_x$ emissions is a large measure of the total cost of operating a fluidized system. It has been found that fluid cracking catalysts prepared by intimately mixing basic and acidic solutions of matrix components to form a gel matrix such as from the mixture of basic silica and acidic alumina solutions and continuously maintaining the mixture of the solutions containing the matrix components at a pH of about 3.0 to about 4.5 overcome the stated disadvantages of prior art catalysts used in a fluidized reactor.

In performing the process of forming a zeolitic catalyst in accordance with the present invention, an acid alum solution and a sodium silicate stream containing a substantial portion of active zeolite fines are pumped to a mixing apparatus where the matrix components are mixed in such a manner that the mixture is continuously maintained at a pH no greater than 4.5. The reactants must be intimately mixed to maintain the low pH and achieve the objective of attrition resistance and reduced sulfur oxide emission during the regeneration of the catalyst. Mixing the matrix components through a nozzle or vigorously stirring the components simultaneously with or immediately following contact have been found acceptable in maintaining the desired low pH, although nozzle mixing is preferred in forming catalysts of greatly reduced sulfur emissions.

The acid alum solution is an acidic solution comprising an aqueous solution of sulfuric acid and aluminum sulfate. The sodium silicate stream is a basic solution comprising a mixture of an aqueous sodium silicate solution and finely dispersed kaolin clay and calcined active crystalline zeolite. The crystalline aluminosilicate zeolite which can be used can be chosen among the naturally occuring crystalline zeolites such as faujasite, mordenite, erionite, etc. Additionally, synthetic crystalline aluminosilicate zeolites which may be useful in forming the catalyst include zeolite X, zeolite Y, etc. The preferred crystalline zeolite useful in the catalyst forming method of the present invention as well as for use in the fluid catalytic cracking process is a calcined rare earth exchanged zeolite Y.

After the acid alum solution and sodium silicate stream have been mixed, the gel mixture is immediately homogenized, as for example, by being passed sequentially through a Charlotte Mill and Matin-Gaulin homogenizer. The material is then spray dried. The resulting spray dried product can then be ion exchanged with ammonium ions such as from an aqueous ammonium sulfate solution and then water washed to remove the sulfate. The washed product can then be further ion exchanged with rare earth ions. It will be understood that rare earth ions include those contained in a salt or a mixture of salt wherein the anion can be a chloride, nitrate, or acetate. The rare earth ion may be, for example, cerium, lanthanum, praseodymium, neodymium, samarium, and ytterium. Furthermore, mixtures of rare earth salts can be used.

The finely dispersed fines which are mixed with the sodium silicate solution can include one or more natural or synthetic crystalline aluminosilicate zeolites, such as the preferred rare earth exchanged Y-zeolite. Such fines may also include inorganic solids that have no effect on the cracking action of the catalyst but whose presence increases with the attrition resistance of a final catalyst. Among these latter solids can be mentioned the alumina and kaolin clay matrix components. In addition, recycled fines from the spray drying step may be used.

It should be mentioned that the steps of ion exchanging and spray drying are conventional and well-known in the art. For example, typical ion exchange procedures are described in U.S. Pat. Nos. 3,140,249; 3,140,251; and 3,140,253. Such procedures comprise contacting the zeolite with the salt of the desired replacing ion at from about 40° F. to about 120° F. Drying temperatures may range from about 150° F. to about 600° F.

According to the invention, catalysts which are prepared by continuously maintaining the gelled matrix at a pH of less than 4.5 and, preferably at a pH of between about 3–4.5 from initial mixing to completion thereof can be advantageously used as cracking catalysts in a fluidized cracking process in which the catalyst is continually cycled between a reaction zone and a regeneration zone. The catalysts are used in a conventional manner suitable for the particular fluidized system in which the catalyst is to be used. It has been found that when the catalysts which have been formed by mixing as discussed above are used in a fluidized system, the sulfur oxides in the flue gas in the regenerator are substantially lowered. It has been found that increased hydrogen sulfide is produced and removed from the reaction zone along with the hydrocarbon stream which has been subjected to cracking. As mentioned previously, gaseous sulfur compounds such as hydrogen sulfide can be removed from the reactor effluent much easier and with less capital expense than the expense involved in reducing the levels of sulfur in the hydrocarbon feed or removing the $SO_x$ emissions from the flue gas of the regenerator.

Having described the invention in general terms, the following examples are offered as illustrations thereof. The examples, as well as the comparisons, are provided in order to demonstrate the surprising and advantageous results which can be obtained using a catalyst prepared according to the invention, by providing a substantial lowering of the level of $SO_x$ in FCC regenerator flue gas as well as produce a high-density catalyst comparable to the dense commercially available catalyst with no loss in the product selectivity.

EXAMPLE 1

The catalyst herein formed consists of 20% by weight rare earth exchanged and calcined zeolite Y (REY) in a silica-alumina-clay matrix. The REY is formed from ion exchange of the sodium form of zeolite Y such that 68% of the sodium cations have been replaced by rare earth cations including Sm, Nd, Pr, Ce, and La having the distribution as indicated in Table 1. After ion exchange, the resulting REY product was calcined for about 10 minutes at 1200° F. The chemical composition of the REY is presented in Table 1.

The REY was incorporated in a gel matrix consisting of 60.5% $SiO_2$, 4.5% $Al_2O_3$, and 35% clay, percentages by weight. The catalyst was prepared as follows: 2100 grams of Georgia kaolin clay of a dry basis was mixed with 7.3 grams Q-brand sodium silicate (8.9% $Na_2O$, 28.7% $SiO_2$) and 3750 grams $H_2O$ and ground for one hour in a ball mill. The clay slowly was brought to 30% solids by adding 1150 grams H$_2$O. 1500 grams of the REY from above on a dry basis was mixed with 9 grams of a dispersant, "Marasperse N", and 3000 grams H$_2$O and ground for one hour in a ball mill. The REY slurry was brought to 25% solids by adding 1500 grams H$_2$O. 27.83 pounds Q-brand sodium silicate was mixed well with 16.56 pounds H$_2$O and the clay and REY slurries were added, stirring continuously until the solution was used. An acid alum solution was prepared by mixing 3.64 pounds Al$_2$(SO$_4$)$_3$ (MW=616) with 60.29 pounds H$_2$O and 0.9 pound H$_2$SO$_4$ (96.2 percent acid).

The acid alum and clay, REY, silicate solutions were mixed through a 0.029 inch diameter nozzle at solution rates of 345 cc/min for the acid alum and 340 cc/min for the clay, REY, silicate solution. The resulting mixture had a pH of 4.0–4.15.

The mixture was immediately homogenized and spray dried with an inlet temperature of 700° F. and an outlet temperature of 350° F.

The resulting spray dried product was ion exchanged with 5% aqueous ammonium sulfate solution and then water washed substantially free of sulfate. The washed product was then further ion exchanged with 1% aqueous solution of rare earth chloride, water washed substantially free of chloride and dried at 250° F. for about 40 hours in air. The physical and chemical properties of the final catalyst are given in Table 2.

EXAMPLE 1A

The starting material for this example is the catalyst of Example 1. This catalyst was impregnated with a solution of Pt(NH$_3$)$_4$Cl$_2$ containing enough Pt to impregnate the catalyst with 3 ppm. Enough solution was used to fill the catalyst pores. After impregnation, the catalyst was dried in air for 16 hours at 250° F.

EXAMPLE 2

This example describes an alternative method of forming a fluid cracking catalyst containing 20% by weight rare earth exchanged and calcined REY from Example 1 in a high-density semi-synthetic silica-alumina-clay matrix. The chemical composition of the REY is given in Table 1.

The REY was incorporated in a high-density clay-gel matrix containing 67.9% SiO$_2$, 10.1% Al$_2$O$_3$, 2% ZrO$_2$ and 20% clay. The matrix was prepared by first dissolving in mixing tank A, 2365 grams of aluminum sulfate (17.2% Al$_2$O$_3$) in 66.4 pounds water, a portion of which was ice. The pH of the solution was adjusted to 1.4 at 32° F. by addition of 120 cc of concentrated sulfuric acid.

In mixing tank B, 930 grams of Georgia kaolin clay (86% solids) were added to 53.4 pounds water, a portion of which was ice. To this slurry, 9425 grams of Q-brand sodium silicate (PQ Corporation, 8.9% Na$_2$O, 28.8% SiO$_2$) was added uniformly over a thirty minute period. The temperature of the resulting slurry was 32° F. and the pH as 11.6.

The contents of mixing tank B were then slowly added to mixing tank A. After 7500 cc of slurry from mixing tank B had been added, the mixture had a pH of 3.6 at 40° F. At this point 200 cc of concentrated sulfuric acid was added to reduce the pH to 1.7. An additional 7500 cc from mixing tank B were added until the mixture pH was 3.4 at 47° F. An additional 200 cc of concentrated sulfuric acid was added to mixing tank A, reducing the pH to 1.9 at 52° F. The remainder of the slurry from mixing tank B was then added slowly to mixing tank A. The resultant gel-slurry had a pH of 3.6 at 55° F.

Next, a slurry prepared by combining 167 grams of sodium zirconium silicate (48% ZrO$_2$), 108 cc of concentrated sulfuric acid and 1620 cc water was added to the gel-slurry over a 15 minute period, reducing the pH of the entire mixture to 3.4.

The REY (20% weight) was added to the clay-gel mixture so formed. The pH was then adjusted to 4–4.5 by addition of 862 cc of 50% sodium hydroxide. The mixture was filtered to remove water and dissolved salts and then reslurried with 23 pounds of water. The gel-zeolite mixture was then homogenized and spray dried at 700° F. inlet temperature, 350° F. outlet temperature.

The resulting spray dried product was ion exchanged with 5% aqueous ammonium sulfate solution, then water washed substantially free of sulfate. The washed product was then further ion exchanged with 1% aqueous solution of rare earth chloride, water washed substantially free of chloride and then dried at 250° F. The physical and chemical properties of the final catalyst are given in Table 2.

EXAMPLE 3

The catalyst of this example, consists of 25% by weight ZSM-5 in a silica-alumina matrix. The gel matrix consists of 93% SiO$_2$ and 7% Al$_2$O$_3$, percentages by weight.

The catalyst was prepared as follows: 80.34 pounds of Q-brand sodium silicate (8.9% Na$_2$O, 28.7% SiO$_2$) was mixed with 61.3 pounds of H$_2$O. An acid-alum solution was prepared by mixing 10.48 pounds of Al$_2$(SO$_4$)$_3$ (MW=616) with 110.5 pounds of H$_2$O and 4.15 pounds of H$_2$SO$_4$ (96.3% acid).

The acid alum and silicate solutions were intimately mixed in a nozzle at rates of 410 and 365 cc/min, respectively. The resulting mixture had a pH of 3.5.

The pH was increased to 4.5 by adding NH$_4$OH (29.6%) causing the mixture to gel while stirring continuously.

A sufficient quantity of a 20% weight slurry of ZSM-5 and water was added to the gel to give 25% by weight ZSM-5 in the final catalyst on a dry basis.

The gel matrix-ZSM-5 mixture was filtered to 16% by weight solids and reslurried to 11% by weight solids with H$_2$O. This mixture was immediately homogenized and spray dried with an inlet temperature of 700° F. and an outlet temperature of 350° F.

The resulting spray dried product was ion exchanged with 5% aqueous ammonium sulfate solution and water washed substantially free of sulfate. The product was then dried at 250° F. for more 40 hours. The physical and chemical properties of the final catalyst are given in Table 2.

EXAMPLE 4

This example describes another process of forming a high-density fluid hydrocarbon conversion catalyst containing 25% by weight ZSM-5 in a semi-synthetic matrix consisting of 74.4% SiO$_2$, 5.6% Al$_2$O$_3$ and 20% clay.

The matrix was prepared by first dissolving, in mixing tank A, 1306 grams of aluminum sulfate in 56.5 pounds water, a portion of which was ice. The pH of the solution was adjusted to 0.7 at 77° F. by addition of 537 cc of concentrated (96.2% weight) sulfuric acid.

In mixing tank B, 930 grams of Georgia kaolin clay were added to 63.4 pounds water, a portion of which was ice. To this slurry 10,333 grams of Q-brand sodium silicate (PQ Corporation, 8.9% Na$_2$O, 28.8% SiO$_2$) was added uniformly over a 30 minute period. The temperature of the resulting slurry was 43° F. and the pH was 11.4.

The contents of mixing drum B were then added to mixing drum A over a one hour period. The final mixture pH was 3.6 at 67° F. The pH of the mixture was adjusted to 4.1 by addition of 330 cc of 50% sodium hydroxide.

The ZSM-5 (25% weight) was added to the clay-gel mixture so formed and the zeolite-clay-gel mixture was filtered to remove water and dissolved salts. It was then reslurried with water, homogenized and spray dried at 700° F. inlet temperature, 350° F. outlet temperature.

The resulting spray dried product was ion exchanged with 5% aqueous ammonium sulfate solution, then water washed substantially free of sulfate and then dried at 250° F. The physical and chemical properties of the final product are given in Table 2.

EXAMPLE 5

The catalyst of this example was prepared as follows using REY from Example 1. The matrix of this catalyst was also a gel matrix consisting of 60.5% SiO$_2$, 4.5% Al$_2$O$_3$ and 35% clay. 1750 grams of Georgia kaolin clay on a dry basis was mixed with 110.1 pounds H$_2$O. 10,495 grams of Q-brand sodium silicate was added slowly over a 30 minute period. The admixture was then heated to 120° F. and 541 cc of sulfuric acid (96.7% acid) was added at a uniform rate over a one hour period to adjust the pH to about 10.4. The resulting gel which formed was aged by heating to 120° F. for 30 minutes and thereafter cooling to ambient temperature. Alumina was then incorporated by adding a 20% weight aqueous solution of aluminum sulfate (17.2% weight Al$_2$O$_3$) over a 30 minute period to a pH of about 3.9. The pH of the mixture was then adjusted to 4.5 to prevent aging or deterioration of the gel, using 50% weight NaOH in water. The REY (20% weight) was added to the clay-gel mixture.

The resulting composite was homogenized and spray dried as described in Example 1 and the spray dried product was ion exchanged and dried again as described in Example 1. The physical and chemical properties of the final product are given in Table 2.

EXAMPLES 6, 7, 8 AND 9

The catalysts of these examples are commercial cracking catalysts sold under the names Super-D (manufactured by Davison Chemical Division of W. R. Grace & Co.), FS-30, FOC-90 and OPC-4 (all manufactured by Filtrol Corp.), respectively. The chemical composition and physical properties of each are given in Table 2.

EXAMPLE 10

The starting material for the catalyst of this example is a commercial catalyst sold under the name HFZ-20 (manufactured by Engelhard Minerals & Chemical Corp.). This material was ion exchanged with a solution of rare earth chloride in water containing enough rare earth chloride to give 3% RE$_2$O$_3$ on the final catalyst. After exchange, the catalyst was water washed substantially chloride free and dried in air for about 16 hours at 250° F.

EXAMPLE 10A

The starting material for this example is the same as for Example 10. This material was exchanged with the same solution as in Example 10 which also included Pt(NH$_3$)$_4$Cl$_2$, enough to give 3 ppm Pt on the final catalyst. The catalyst was washed and dried as in Example 10.

EXAMPLE 11

The catalyst of this example consists of 25% by weight ZSM-5 in a silica-alumina matrix. The gel matrix consists of 93% SiO$_2$ and 7% Al$_2$O$_3$, percentages by weight.

The catalyst was prepared as follows: 28.55 pounds of Q-brand sodium silicate (8.9% Na$_2$O, 28.7% SiO$_2$) were mixed with 21.6 pounds of H$_2$O. An acid-alum solution was prepared by mixing 1691.0 grams of Al$_2$(SO$_4$)$_3$ with 39.2 pounds of H$_2$O and 670.2 grams of H$_2$SO$_4$ (96.3% acid).

The acid-alum and silicate solutions were pumped separately but at the same time into a 30 gallon mixing drum at rates of 380 and 365 cc/minute, respectively. 6000 cc of H$_2$O were placed in the bottom of the mixing drum so that mixing could begin as soon as the solutions contacted the water. In the bottom of the barrel was placed a stirrer. The resulting mixture had a pH of 3.5. Additionally, ice was added to lower the temperature to 55° F.

The pH was increased to 4.5 by adding 195 cc of NH$_4$OH (29.6%) causing the mixture to gel while stirring continuously. A sufficient quantity of a 20% weight slurry of ZSM-5 and water was added to the gel to give 25% by weight ZSM-5 in the final catalyst on a dry basis.

The gel matrix-ZSM-5 mixture was filtered to 18% by weight solids and reslurried to 12% by weight solids with 30.38 pounds of H$_2$O. This mixture was immediately homogenized and spray dried with an inlet temperature of 700° F. and outlet temperature of 350° F.

The resulting spray dried particles were ion exchanged with 5% aqueous ammonium sulfate solution and then water washed substantially free of sulfate. The particles were then dried at 250° F. for about 40 hours. The physical and chemical properties of the final catalyst are given in Table 2.

TABLE 1

| Chemical Composition of Calcined REY of Examples 1, 2 and 5 | |
|---|---|
| Na, % wt | 3.2 |
| Total RE$_2$O$_3$, % wt | 15.9 |
| Sm$_2$O$_3$, % wt | 0.10 |
| Nd$_2$O$_3$, % wt | 3.70 |
| Pr$_6$O$_{11}$, % wt | 1.05 |
| CeO$_2$, % wt | 1.61 |
| La$_2$O$_3$, % wt | 9.47 |
| SiO$_2$, % wt | 61.4 |
| Al$_2$O$_3$ % wt | 21.7 |

From a comparison of the physical and chemical properties of the individual catalysts set forth in Table 2, it can be seen that the packed density and pore volume of the catalysts formed in accordance with present invention, Examples 1–4 and 11 are comparable to those of a typical commercial catalyst such as the catalyst of Example 6. In Example 5, a catalyst was formed with the same chemical composition as the catalyst of Example 1, but utilizing a different forming method. The catalyst of Example 5 has a more open structure as evidenced by the higher surface area and pore volume and lower packed density.

EXAMPLE 12

Fresh catalyst from Examples 1 and 5–10 were steam treated in a fluidized bed for 4 hours at 1400° F. with 100% steam at 0 psig. The steamed catalysts were used to crack a high-sulfur sour heavy gas oil, the properties of which are given in Table 3, in a fixed fluidized bed at 960° F., 1.0 minute on-stream.

The catalyst prepared according to the teachings of the present invention (Example 1) has the same activity as the commercial type catalyst (Example 6) as shown by the equivalent conversion at the same catalyst/oil ratio in Table 4. The catalyst of Example 1 is less active than the catalyst of Example 5 because of the higher diffusional resistance provided by the more closed structure. The catalyst of Example 1 yields as much gasoline as the catalyst with the same physical properties indicating that the catalyst formed in accordance with the teachings of the present invention is as selec-

TABLE 2

| | Physical and Chemical Properties of Catalysts | | | | | | | | | | | |
|---|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 | Ex. 10a | Ex. 11 |
| Chemical Analysis | | | | | | | | | | | | |
| $Na_2O$, % wt | 0.15 | 0.19 | 0.03 | 0.12 | 0.12 | 0.70 | 0.52 | 0.69 | 0.54 | 0.92 | 0.91 | 0.06 |
| $RE_2O_3$, % wt | 4.83 | 4.41 | — | — | 4.95 | 3.02 | 2.99 | 0.49 | 3.49 | 3.03 | 3.41 | — |
| $SiO_2$, % wt | 70.1 | 71.1 | 86.6 | 81.4 | 70.1 | 61.0 | 51.0 | 50.5 | 47.2 | 37.8 | 37.6 | 87.6 |
| $Al_2O_3$, % wt | 18.9 | 16.5 | 6.2 | 11.9 | 20.1 | 29.9 | 40.3 | 40.4 | 43.6 | 57.4 | 57.2 | 6.4 |
| Physical Properties\* | | | | | | | | | | | | |
| Packed Density, gm/cc | 0.83 | 0.97 | 0.87 | 0.76 | 0.61 | 0.86 | 0.85 | 0.73 | 0.79 | 0.90 | 0.94 | 0.77 |
| Pore Volume, cc/gm | 0.22 | 0.09 | 0.23 | 0.26 | 0.55 | 0.23 | 0.37 | 0.46 | 0.41 | 0.42 | 0.42 | 0.24 |
| Surface Area, $m^2$/gm | 96 | 96 | 167 | 249 | 181 | 102 | 137 | 141 | 129 | 253 | 239 | — |

\*Physical properties determined after steaming for 4 hours, 1400° F., 0 psig, 100% steam in a fluidized bed, except for Examples 3 and 4 the properties of which were determined after 0.5 hours, 1200° F., 100% $N_2$, 0 psig in a fluidized bed.

TABLE 3

| High Sulfur Sour Heavy Gas Oil | |
|---|---|
| Gravity, °API | 24.3 |
| Aniline Pt. °F. | 171 |
| Sulfur, % wt | 1.87 |
| Nitrogen, % wt | 0.10 |
| Basic Nitrogen, ppm | 327 |
| Conradson Carbon, % wt | 0.28 |
| Viscosity, KV at 210° F. | 3.6 |
| Bromine No. | 4.2 |
| Refractive Index at 70° F. | 1.5080 |
| Hydrogen, % wt | 12.3 |
| Molecular wt | 358 |
| Pour Point, °F. | 85 |
| Paraffins, % wt | 23.5 |
| Naphthenes, % wt | 32.0 |
| Aromatics, % wt | 44.5 |
| $C_A$, wt % | 18.9 |

The resultant product distributions are given in Table 4 for the catalysts set forth in Examples 1, 5, and 6 and which were used to crack the high-sulfur sour heavy gas oil set forth in Table 3.

TABLE 4

| Catalysts\* Cracking High-Sulfur Sour Heavy Gas Oil, 960° F., 1.0 min. on-stream | | | |
|---|---|---|---|
| Catalyst Example | 1 | 5 | 6 |
| Catalyst/oil, wt/wt | 2.5 | 2.0 | 2.5 |
| WHSV, $Hr^{-1}$ | 24.0 | 30.0 | 24.0 |
| Conversion, % Vol | 70.8 | 70.0 | 70.3 |
| $C_5$ + Gasoline, % Vol | 55.5 | 57.5 | 55.2 |
| Total $C_4$, % Vol | 16.4 | 13.2 | 15.3 |
| Dry Gas, % Wt | 8.5 | 7.8 | 8.5 |
| Coke, % Wt | 4.0 | 3.5 | 4.4 |
| $C_5$ + Gasoline + Alkylate, % Vol | 76.1 | 76.2 | 75.0 |
| RON + 0, $C_5$ + Gasoline | 88.7 | 86.9 | 87.6 |
| RON + 0, $C_5$ + Gasoline + Alkylate | 90.1 | 88.6 | 89.2 |
| Conversion/Coke, Vol/Wt | 17.7 | 20.0 | 16.0 |
| $C_5$ + Gasoline/Conversion Vol/Vol | 0.784 | 0.821 | 0.785 |
| $C_5$ + Gasoline/Coke, Vol/Wt | 13.9 | 16.4 | 12.5 |

\*Steam treated in fluidized bed 4 hours at 1400° F., 100% steam, 0 psig.

tive. This is accompanied by an increase in the research clear octane number. The total $C_4$ yield of the catalyst of the present invention is greater entirely at the expense of coke formation. The more open structure of the catalyst of Example 5 results in more gasoline than Example 1. Lower secondary cracking rates due to the greater diffusivity are responsible for the higher gasoline yield and lower $C_4$, dry gas and coke yields. This also causes the octane number of the gasoline to be lower as the lower octane components of the gasoline are not cracked out. When the potential alkylate of the three catalysts is included in the analysis, the total gasoline yield of Example 1 is increased to the amount of Example 5. A significant octane advantage still exists for the gasoline of Example 1. The commercial catalyst of Example 6 has a deficit in both total gasoline yield and octane number.

EXAMPLE 13

The sulfur emissions from the burnoff of the coke were determined by oxidizing the coke-containing spent catalyst in a stream of oxygen at about 1200° F. and passing the effluent gas through a 3% solution of hydrogen peroxide in water, thus converting $SO_2$ to $SO_3$ and absorbing all of the $SO_3$. The sulfate formed was titrated as sulfuric acid with standard base NaOH.

Table 5 presents the sulfur emissions of the example catalysts in several ways. The sulfur on-catalyst (S/CAT) figures give an indication of the amount of sulfur released per weight of catalyst while the sulfur in coke (% S/C) values relate the sulfur released to the amount of coke burned. The third set of figures, sulfur per barrel of feed converted (lb S/bbl feed converted) is influenced by the activity of the catalysts.

TABLE 5

| Sulfur Emissions of Coked Catalysts | | | | |
|---|---|---|---|---|
| Catalyst Example | % C/Cat | S/CAT, ppm | % S/C | lb S/bbl feed converted |
| 1 | 1.338 | 71 | 0.53 | 0.093 |
| | 1.378 | 79 | 0.57 | 0.089 |
| 1a | 1.399 | 69 | 0.49 | 0.092 |
| 5 | 1.562 | 151 | 0.96 | 0.189 |

TABLE 5-continued

Sulfur Emissions of Coked Catalysts

| Catalyst Example | % C/Cat | S/CAT, ppm | % S/C | lb S/bbl feed converted |
|---|---|---|---|---|
| 6 | 1.487 | 280 | 1.88 | 0.366 |
| 7 | 1.511 | 184 | 1.18 | 0.230 |
| 8 | 0.983 | 157 | 1.72 | 0.215 |
| 9 | 1.962 | 324 | 1.65 | 0.398 |
| 10 | 2.257 | 155 | 0.69 | 0.179 |
| 10a | 2.259 | 242 | 1.07 | 0.285 |

From Table 5, it can be seen that when the matrix components of a fluid cracking catalyst are intimately mixed as previously described such that the pH is maintained at 3.0–4.5, a very substantial reduction of sulfur emissions results. At least a 50% reduction occurs compared to all catalysts in sulfur on catalyst. The effect of a platinum oxidation promoter in this example is demonstrated by the catalyst of Example 10a. Compared to the catalyst of Example 10, an increase in the sulfur emissions is measured. This has not been the case in commercial measurements of $SO_x$ emissions for units operating with some degree of promoted CO combustion. Data from a commercial FCC unit have shown that in the complete combustion mode, $SO_x$ emissions are reduced to a greater extent than expected based on reduced coke yields. The effect of the platinum in this example on the catalyst of Example 1, as shown by Example 1a, is overwhelmed by the capability of the catalyst to reduce the sulfur emissions and no increase is observed.

The preferred embodiment of the invention having been described, many variations and obvious modifications of the invention will be apparent to those skilled in the art. Such modifications and variations are intended to be included in the scope of the invention, as defined in the appended claims.

What is claimed is:

1. A method of preparing a high-density cracking catalyst with reduced sulfur emmissions from coke, said catalyst comprising active catalytic crystalline aluminosilicate zeolite fines dispersed in an amorphous matrix, said method consisting essentially of the steps of mixing a basic solution containing silica with an acidic solution containing alumina, adding to the mixture said active catalytic zeolite fines, continuously maintaining said mixture at a pH of about 3.0 to about 4.5 from initial mixing to the formation of a gel matrix, homogenizing the gel matrix and spray drying the homogenized gel.

2. The method of claim 1 wherein said basic solution comprises an aqueous sodium silicate solution and said acidic solution comprises an acid-alum solution.

3. The method of claim 1 wherein said zeolite is a rare earth exchanged zeolite.

4. The method of claim 3 wherein said zeolite is a rare earth exchanged zeolite Y.

5. The method of claim 1 wherein said mixing comprises providing said basic and acidic solutions from separate supplies and providing the separate solutions with a positive velocity simultaneous with or immediately after formation of said mixture.

6. The method of claim 5 wherein said separate solutions are simultaneously passed through a nozzle.

7. The method of claim 5 wherein said solutions are stirred simultaneously with or immediately following formation of said mixture.

8. The method of claim 5 wherein said basic solution is added to the supply of said acidic solution.

9. A catalyst formed by the method as set forth in claim 1.

10. The catalyst of claim 9 wherein said zeolites are present in amounts of about 5 to 30% by weight of said catalyst.

11. The catalyst of claim 9 wherein said zeolites comprise rare earth exchanged zeolite Y.

* * * * *

UNITED STATES PATENT AND TRADEMARK OFFICE
CERTIFICATE OF CORRECTION

PATENT NO. : 4,508,840

DATED : April 2, 1985

INVENTOR(S) : W. E. Cormier, Jr., C. M. Pasquale & W. A. Stover

It is certified that error appears in the above-identified patent and that said Letters Patent is hereby corrected as shown below:

[57], Abstract, "of tha" should be --of the--.

Col. 4, line 20, insert --catalyst-- after "cracking".

Signed and Sealed this

Fifteenth Day of October 1985

[SEAL]

Attest:

Attesting Officer

DONALD J. QUIGG

Commissioner of Patents and
Trademarks—Designate